(12) United States Patent
Shigematsu et al.

(10) Patent No.: US 9,267,589 B2
(45) Date of Patent: Feb. 23, 2016

(54) MULTI-SHAFT DRIVE DEVICE

(75) Inventors: Ryohei Shigematsu, Yokohama (JP); Takafumi Hirata, Yokohama (JP); Shinji Iino, Yokohama (JP); Soichi Nakayama, Yokohama (JP); Takeshi Nakamura, Yokohama (JP); Masahiro Oda, Yokohama (JP); Kenichi Katsube, Yokohama (JP)

(73) Assignee: NHK SPRING CO., LTD., Yokohama-Shi (JP)

( * ) Notice: Subject to any disclaimer, the term of this patent is extended or adjusted under 35 U.S.C. 154(b) by 233 days.

(21) Appl. No.: 14/001,671

(22) PCT Filed: Jan. 24, 2012

(86) PCT No.: PCT/JP2012/051458
§ 371 (c)(1),
(2), (4) Date: Aug. 26, 2013

(87) PCT Pub. No.: WO2012/117771
PCT Pub. Date: Sep. 7, 2012

(65) Prior Publication Data
US 2013/0327181 A1  Dec. 12, 2013

(30) Foreign Application Priority Data
Feb. 28, 2011 (JP) .................. 2011-042118

(51) Int. Cl.
*F16H 37/12*  (2006.01)
*F16H 1/14*  (2006.01)
(Continued)

(52) U.S. Cl.
CPC ............ *F16H 37/065* (2013.01); *B60N 2/0296* (2013.01); *F16H 1/222* (2013.01);
(Continued)

(58) Field of Classification Search
CPC ............ F16H 1/006; F16H 1/12; F16H 1/14; F16H 1/22; F16H 1/222; F16H 3/08; F16H 3/085; F16H 3/083; F16H 3/22; F16H 19/04; F16H 21/14; F16H 21/28; F16H 37/065; F16H 53/06; F16D 2023/123; F16D 2125/28; F16D 2125/30; F16D 2125/32; B23P 15/14; B60N 2/0296; Y10T 74/19028
USPC ............. 74/30, 35, 99 A, 109, 120, 133, 130, 74/395, 396, 405, 406, 665 F, 665 GC, 422, 74/89.11, 89.12, 89.17, 491, 496, 497, 70, 74/79; 29/893.1; 297/311, 312, 374; 192/48.8, 48.2, 48.9, 93 B, 94; 49/136
See application file for complete search history.

(56) References Cited

U.S. PATENT DOCUMENTS 2,674,182 A * 4/1954 Kirkpatrick .................. 100/288
2,845,807 A * 8/1958 Harless ........................... 74/378
(Continued)

FOREIGN PATENT DOCUMENTS

JP  54-41898  * 12/1979 ............... F16H 1/22
JP  06-156123 A  6/1994

*Primary Examiner* — William Kelleher
*Assistant Examiner* — Bobby Rushing, Jr.
(74) *Attorney, Agent, or Firm* — Knobbe Martens Olson & Bear LLP

(57) ABSTRACT

The present invention obtains a multi-shaft drive device that can protect a rack and pinion from operative load input to a selector. The multi-shaft drive device is provided with: an input-side bevel gear (52) to which motor power is transmitted; and an output-side bevel gear (34) that transmits the power transmitted from the input-side bevel gear (52) to a movable mechanism. The multi-shaft drive device is further provided with: a selector (10) that connects/disconnects the meshing of the output-side bevel gear (34) and the input-side bevel gear (52); and a rotating shaft (16) that causes the selector (10) to slide via a rack (18) and pinion (17). Furthermore, the angle of rotation of the rotating shaft (16) is regulated by the end of the pinion (17) contacting a vertical wall (1A) of a case (1).

3 Claims, 7 Drawing Sheets

(51) Int. Cl.
*F16H 19/04* (2006.01)
*F16H 21/28* (2006.01)
*F16H 3/22* (2006.01)
*B60N 2/02* (2006.01)
*F16H 37/06* (2006.01)
*F16H 1/22* (2006.01)
*F16D 125/28* (2012.01)
*F16D 23/12* (2006.01)

(52) U.S. Cl.
CPC .............. *F16H 3/22* (2013.01); *F16H 19/04* (2013.01); *F16H 21/28* (2013.01); *F16D 2023/123* (2013.01); *F16D 2125/28* (2013.01); *Y10T 74/19019* (2015.01)

(56) References Cited

U.S. PATENT DOCUMENTS 4,299,316 A * 11/1981 Reinmoeller ................ 192/48.8
5,009,296 A *  4/1991 Ohkawa et al. ................ 192/20

* cited by examiner

MULTI-SHAFT DRIVE DEVICE

CROSS-REFERENCE TO RELATED APPLICATIONS

This application is the U.S. National Phase under 35. U.S.C. §371 of International Application PCT/JP2012/051458, filed Jan. 24, 2012, which claims priority to Japanese Patent Application No. 2011-042118, filed Feb. 28, 2011. The disclosures of the above-described applications are hereby incorporated by reference in their entirety. The International Application was published under PCT Article 21(2) in a language other than English.

TECHNICAL FIELD

The present invention relates to a multi-shaft drive device that is preferably applied to for example an electric vehicle seat and that drives plural output shafts with a single motor.

BACKGROUND ART

Many vehicle seats are of a type enabling adjustment of position to plural locations, for example sliding the overall seat in the front-rear direction, moving the height of the seat face up and down, or reclining the seatback (backrest) to suit the build and posture of an occupant. Such adjustment of movable locations may be performed manually, however more convenient electric seats are provided that use the drive of a motor to perform adjustments.

In order to independently drive plural respective movable locations, a configuration wherein motors are individually coupled to respective drive shafts that are each coupled to a movable location may be considered, however this would increase the number of motors. Since it is more efficient for a single motor to drive plural output shafts, proposals have been made wherein the power of a motor is transmitted through clutches to respective output shafts coupled to the plural movable locations, and each of the movable locations is selectively driven by disconnecting the clutches (see for example Patent Document 1).

Patent Document 1: Japanese Patent Application Laid-Open (JP-A) No. H6-156123

DISCLOSURE OF INVENTION

Technical Problem

However, when a selector for selecting the output shaft to which to transmit the power of the motor is configured including a rack and a pinion, it is desirable to protect the rack and the pinion from operation load input to the selector.

In consideration of the above circumstances, an object of the present invention is to obtain a multi-shaft drive device capable of protecting a rack and pinion from operation load input to a selector.

Solution to Problem

A multi-shaft drive device according to a first aspect includes: a single motor that is fixed to a case and that drives plural movable mechanisms mounted to a vehicle; an input side gear that is provided inside the case and that transmits power of the motor; an output side gear that is provided so as to be capable of projecting forwards and retreating with respect to the input side gear, thereby selectively enmeshing with the input side gear, and transmitting power transmitted from the input side gear to the movable mechanism; a selector that is provided with a rack to allow the selector to slide in one direction and an opposite direction to the one direction, that presses a portion of the output side gear to move the output side gear back, and that disconnects enmeshing between the output side gear and the input side gear; a rotation shaft that is provided with a pinion that enmeshes with the rack provided to the selector, the rotation shaft rotating about its axis due to operation force input to an operation means so as to slide the selector; and a restriction portion that is provided to a side of the operation means including the rotation shaft, and that restricts the rotation angle of the rotation shaft.

According to the above aspect, operation force input into the operation means is transmitted to the rack through the pinion by turning the rotation shaft provided with the pinion using the operation means. The selector that is provided with the rack slides as a result. Further, a portion of the selector presses the portion of the output side gear due to the sliding of the selector, thereby moving the output side gear back. Enmeshing between the output side gear and the input side gear is disconnected as a result. In contrast, when the pressing of the portion of the output side gear is released due to the selector sliding in the opposite direction, the output side gear projects forwards. The output side gear enmeshes with the input side gear as a result.

Note that were configuration to be made wherein the rotation angle of the rotation shaft was restricted by the selector contacting for example the case, operation force input into the rotation shaft would be borne by the rack and pinion. There would be a concern of damage being caused to the rack and pinion as a result. However, in the above aspect, the restriction portion that restricts the rotation angle of the rotation shaft is provided to the side of the operation means including the rotation shaft. Such a configuration accordingly prevents operation force input into the rotation shaft from being borne by the rack and pinion such as occurs in a configuration wherein the rotation angle of the rotation shaft is restricted by the selector contacting for example the case.

A multi-shaft drive device according to a second aspect is the first aspect, wherein the restriction portion includes: the operation means fixed to the rotation shaft; and a contacted portion that is provided to the case and is contacted by a portion of the operation means.

According to the above aspect, operation force input into the rotation shaft is borne by the portion of the operation means contacting the contacted portion provided to the case. As a result, operation force input into the rotation shaft is prevented from being borne directly by the rack and pinion.

A multi-shaft drive device according to a third aspect is the first aspect, wherein the restriction portion includes: a contact portion that is provided inside the case and that is formed to a portion of the rotation shaft; and a contacted portion that is provided to the case and that is contacted by the contact portion.

According to the above aspect, operation force input into the rotation shaft is borne by the contact portion formed to a portion of the rotation shaft contacting the contacted portion provided to the case. The contact portion and the contacted portion are provided inside the case of the multi-shaft drive device, thereby suppressing any impact on the external design of the multi-shaft drive device as a result of providing the contact portion and the contacted portion.

Advantageous Effects of Invention

The multi-shaft drive device according to the first aspect and the second aspect described above exhibits the excellent advantageous effect of being capable of protecting the rack and pinion from operation load input to the selector.

The multi-shaft drive device of the third aspect exhibits the excellent advantageous effect of being capable of protecting the rack and pinion from operation force input to the selector without imposing restrictions on the external design of the multi-shaft drive device.

BEST MODE FOR CARRYING OUT THE INVENTION

Explanation follows regarding a multi-shaft drive device according to an exemplary embodiment that drives an electric seat in a vehicle, with reference to the drawings.

(1) Multi-Shaft Drive Device Configuration

Figure 1:
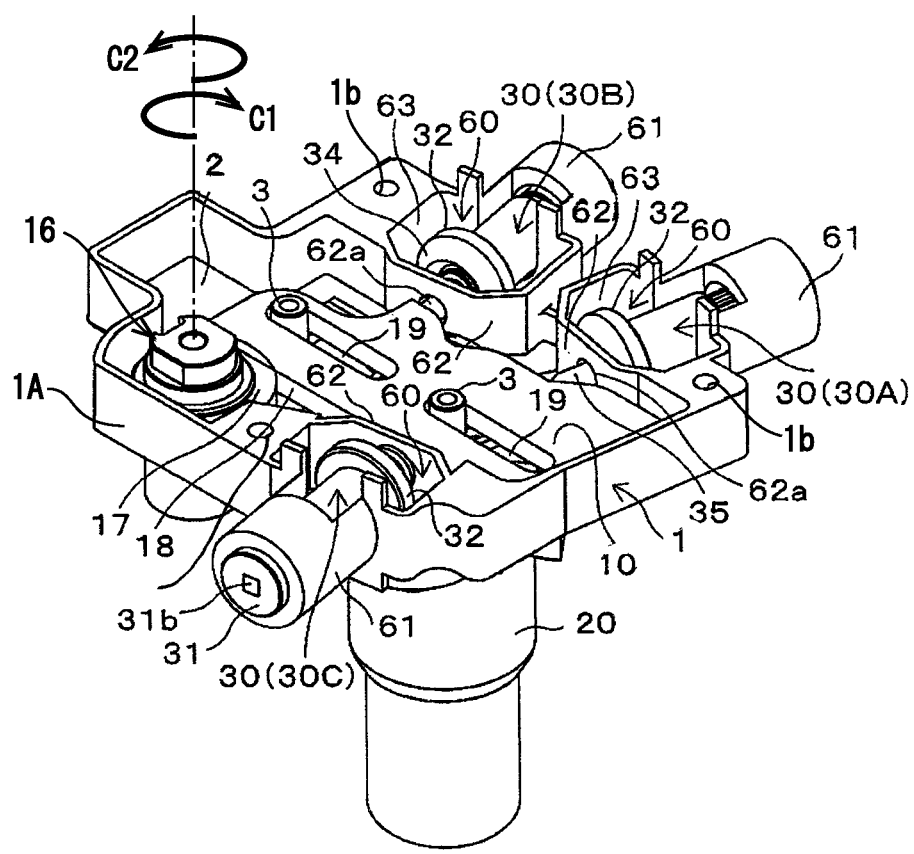
FIG. 1 is a perspective view illustrating a multi-shaft drive device according to an exemplary embodiment.
Figure 2:
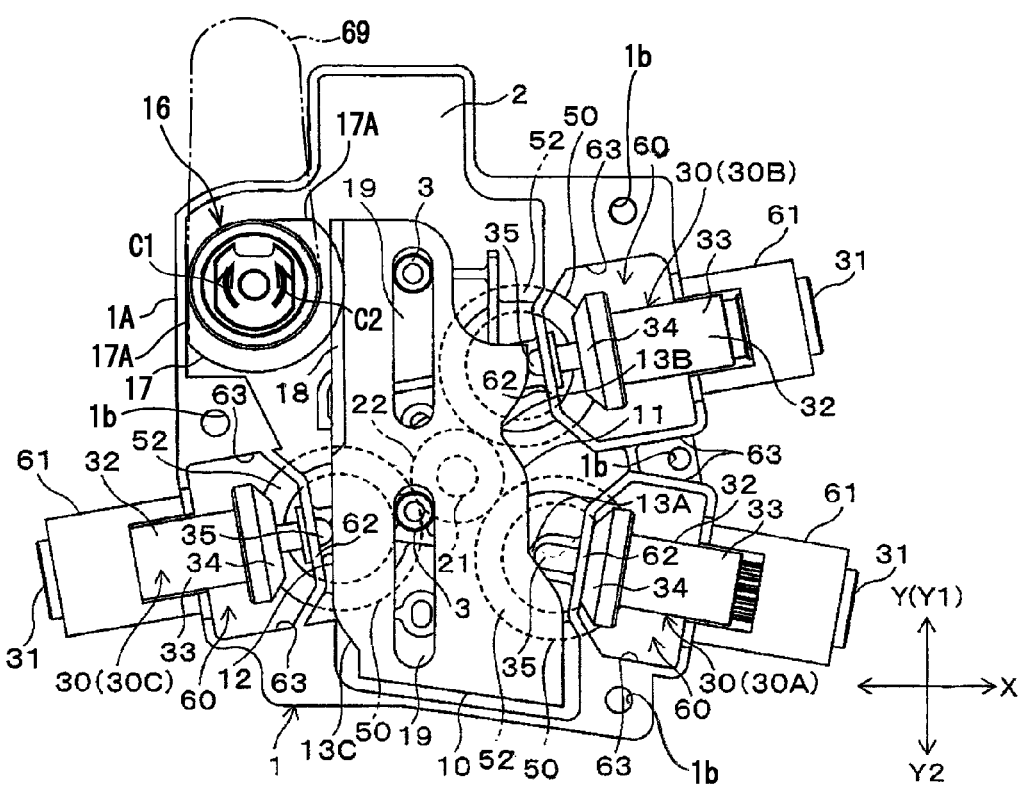
FIG. 2 is a plan view illustrating the multi-shaft drive device.

FIG. 1 and FIG. 2 are a perspective view and a plan view illustrating a multi-shaft drive device according to an exemplary embodiment. FIG. 1 and FIG. 2 illustrate a case 1 including a recessed area 2 that opens upwards, a selector 10 housed in the recessed area 2 of the case 1, and a motor 20 fixed to a lower portion of the case 1. The opening of the recessed area 2 of the case 1 is covered by a cover, not illustrated in the drawings, that is fixed to the case 1. The selector 10 is a substantially rectangular plate shaped member that is long in the Y direction in FIG. 2, and is formed with two guide holes 19 that extend in the Y direction at a width direction (X direction) central portion. Guide projections 3 that project out from a bottom portion of the recessed area 2 are respectively inserted into the guide holes 19. The selector 10 is supported so as to be capable of sliding in the Y direction with the guide holes 19 guided by the guide projections 3.

Out of the two length direction side faces of the selector 10, the side face on the right hand side in FIG. 2 is formed with a first cam face 11. The side face on the left hand side is formed with a second cam face 12 at a lower side and formed with a rack 18 with a row of teeth running in the Y direction at an upper side.

As illustrated in FIG. 2, a rotation shaft 16 that is rotatably supported on the case 1 is provided with a pinion 17 formed so as to extend towards the rotation shaft 16 radial direction outside. The pinion 17 is formed around the circumferential direction of the rotation shaft 16, with contact portions 17A configured at both circumferential direction end portions of the pinion 17, and the contact portion 17A contacts a vertical wall portion 1A of the case 1 that forms the recessed area 2 and serves as a contacted portion. The rotation angle of the rotation shaft 16 is restricted due to the contact portions 17A contacting the vertical wall portion 1A. The pinion 17 is enmeshed with the rack 18. Further, a dial 69 serving as an operation means is fixed to the rotation shaft 16. The pinion 17 rotates when the dial 69 is rotated, thereby moving the selector 10 back and forth along the Y direction through the rack 18 according to the rotation direction of the dial 69.

Figure 3:
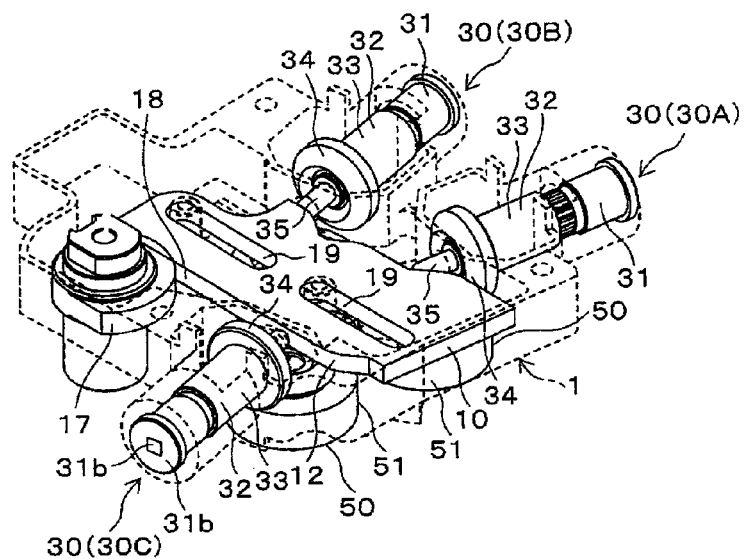
FIG. 3 is a perspective view illustrating movable portions of the multi-shaft drive device.
Figure 4:
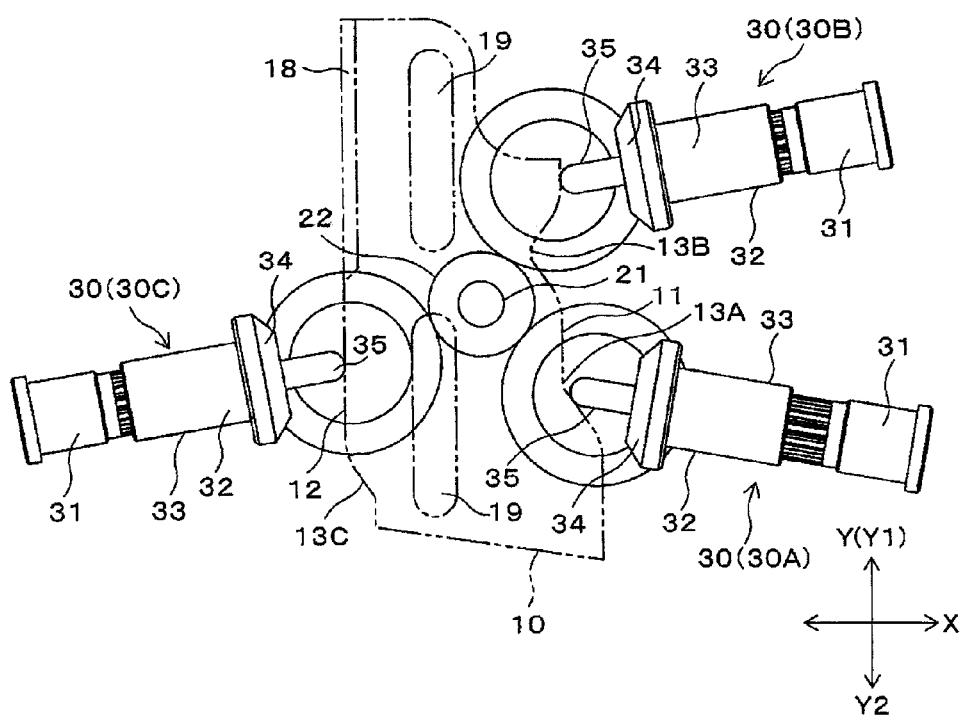
FIG. 4 is a plan view illustrating the movable portions.

As illustrated in FIG. 3 and FIG. 4, output portions 30 are disposed facing each of the cam faces 11, 12 on both X direction sides of the selector 10. In the present example, two output portions 30 (a first output portion 30A and a second output portion 30B) are disposed separated from each other in the Y direction and facing the first cam face 11, and one output portion 30 (a third output portion 30C) is disposed facing the second cam face 12. The output portions 30 are housed in housing portions 60 formed to the case 1 as illustrated in FIG. 1 and FIG. 2.

As illustrated in FIG. 2 and FIG. 4, a motor shaft 21 of the motor 20 projects upwards. The motor shaft 21 can be rotated forwards or in reverse. A pinion 22 is fixed to the motor shaft 21. Three input side clutch members 50 corresponding to the respective output portions 30 are provided to the periphery of the pinion 22 and are rotatably supported on the case 1. Each of the input side clutch members 50 is of a similar configuration, and includes an input gear 51 that enmeshes with the pinion 22 configured by a flattened cog, and an input side bevel gear 52 serving as an input side gear integrally formed to an upper face of the input gear 51. The input side bevel gears 52 are rotatably supported on the case 1 for each of the input side clutch members 50, thereby positioning the input side clutch members 50 at specific positions. The motor 20 is switched ON/OFF, and the rotation direction thereof is selected, for example by a switch provided to the dial 69. When the motor 20 is actuated, all of the input side clutch members 50 rotate.

Figure 5A:
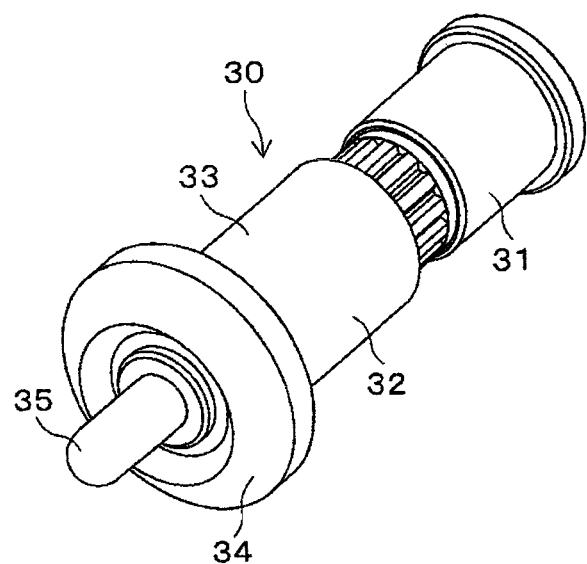
FIG. 5A is a perspective view illustrating an output portion of a multi-shaft drive device of an exemplary embodiment.
Figure 5B:
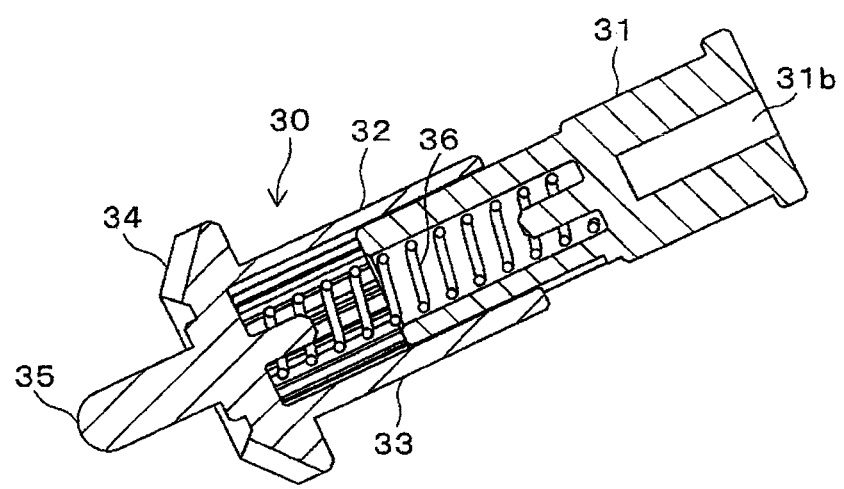
FIG. 5B is a cross-section illustrating an output portion of a multi-shaft drive device of an exemplary embodiment.

Each of the output portions 30 (30A to 30C) are of similar configuration. As illustrated in FIG. 4, FIG. 5A and FIG. 5B, the output portions 30 are configured including an output shaft 31 disposed in a state facing the cam face 11 (12), an output side clutch member 32 provided so as to be capable of rotating together as a unit with the output shaft 31, and also capable of projecting forwards or retreating along the output shaft 31 axial direction with respect to the cam face 11 (12), and a coil spring 36 that biases the output side clutch member 32 so as to project forwards towards the input side bevel gear 52.

The output shafts 31 are rotatably supported by support portions 61 configuring the housing portions 60 of the case 1. The output shafts 31 are respectively connected through torque cables, not illustrated in the drawings, to movable mechanisms provided to an electric seat in a vehicle, for example, a mechanism for adjusting the height of a seat face, a reclining mechanism for adjusting the angle of the seatback (backrest portion), and a mechanism for adjusting the front-rear position of the seat. One end portions of the torque cables are inserted into mounting holes 31*b* (see FIG. 1) of rectangular cross-section profile that are formed to rear end faces of the output shafts 31, and rotate together with the output shafts 31.

As illustrated in FIG. 5A and FIG. 5B, the output side clutch members 32 are each configured including: a circular cylinder shaped slide shaft 33 that is externally mounted to the selector 10 side of the output shaft 31; an output side bevel gear 34 serving as an output side gear that has a toothed face integrally formed to a leading end side of the slide shaft 33 facing towards the selector 10 side; a pin (contact portion) 35 that projects out in the axial direction from the center of the output side bevel gear 34; and the coil spring 36 that biases the slide shaft 33 in the direction of the selector 10.

An inner peripheral face of the slide shaft 33 is not capable of relative rotation in the circumferential direction with respect to the outer peripheral face of the output shaft 31, namely the slide shaft 33 is capable of rotating as a unit together with the output shaft 31, and the two are spline joined together so as to allow sliding along the axial direction. The slide shafts 33 are accordingly capable of projecting forwards or retreating in the output shaft 31 axial direction with respect to the cam faces. The coil spring 36 is housed inside the output shaft 31 and the slide shaft 33 in a compressed state, and biases the slide shaft 33 from the output shaft 31 towards the cam faces 11 (12). Leading ends of the pins 35 of the output side clutch members 32 accordingly abut the cam faces 11 (12) when facing the cam faces 11 (12). Leading end faces of the pins 35 are formed with spherical face shapes, and make sliding contact with the abutting cam faces 11 (12) when the selector 10 is moved in the Y direction by the dial 69 described above.

The first cam face 11 of the selector 10 is formed with a first recessed portion 13A and a second recessed portion 13B serving as cam portions corresponding to the first output portion 30A and the second output portion 30B, and the second cam face 12 is formed with a third recessed portion 13C serving as a cam portion corresponding to the third output portion 30C. When the selector 10 is operated so as to move along the Y direction as described above, the pin 35 of any one of the output portions 30 faces the corresponding recessed portion 13A (13B, 13C). The output side clutch member 32 is biased as a whole towards the cam face 11 (12) by the coil spring 36, such that the pin 35 projects out and fits into the recessed portion 13A (13B, 13C).

The output side clutch member 32 slides as a whole in the selector 10 direction when the pin 35 projects out and fits into the recessed portion 13A (13B, 13C), and the output side bevel gear 34 enmeshes with the input side bevel gear 52, achieving a clutch connected state. When the motor 20 is actuated and the input side clutch member 50 rotates with the clutch connected, the rotation is transmitted from the input side bevel gear 52 to the enmeshed output side bevel gear 34, and the overall output side clutch member 32 rotates. The rotation of the slide shaft 33 is transmitted to the output shaft 31 and the output shaft 31 rotates, thereby rotating and actuating the torque cable. When the pin 35 is not in a state facing the recessed portion 13A (13B, 13C), the pin 35 contacts the cam face 11 (12) at a portion other than the recessed portion 13A (13B, 13C), the cam face 11 (12) pressing the pin 35 towards the output shaft 31 side against the coil spring 36. When this occurs, the output side bevel gear 34 separates from the input side bevel gear 52 to achieve a clutch disconnected state.

The housing portions 60 of the case 1 in which the respective output portions 30 are housed are each formed so as to enclose the respective output side clutch member 32 and include: the circular cylinder shaped support portion 61 that is positioned to a rear portion side of the output portion 30 and that rotatably supports the output shaft 31 in a state restricting movement towards the rear and away from the selector 10; a leading end wall portion 62 positioned at the output portion 30 leading end side; and a pair of side wall portions 63 that are integrally formed with the support portion 61 and the leading end wall portion 62 so as to couple together the support portion 61 and the leading end wall portion 62, and formed to both sides of the output side clutch member 32 including the output side bevel gear 34. The support portion 61, the leading end wall portion 62 and the pair of side wall portions 63 are integrally formed to the case 1.

The leading end wall portion 62 is formed with a through hole 62a that is rotatably penetrated by the pin 35. Each of the output portions 30 is inserted inside the corresponding housing portion 60 with the coil spring 36 compressed to a contracted state such that the output side clutch member 32 and the output shaft 31 mutually approach each other, with the pin 35 passed through the through hole 62a of the leading end wall portion 62 from an upper portion opening. Next, the force from compression is released, and the output shaft 31 is inserted inside the support portion 61, thereby assembling the output portion 30 inside the housing portion 60.

The output shaft 31 of the output portion 30 that has been thus assembled inside the housing portion 60 is rotatably supported by the support portion 61. The pin 35 penetrates the through hole 62a such that both end portions of the output portion 30 are in a rotatably supported state. When the output side clutch member 32 that is biased in the selector 10 direction by the coil spring 36 is in the clutch connected state wherein the pin 35 is fitted into any one of the recessed portions 13A to 13C of the selector 10 and projecting forwards in the selector 10 direction, a leading end face of the output side bevel gear 34 contacts an inner face of the leading end wall portion 62, restricting projection any further forwards towards the selector 10 side.

At this time, in the clutch connected state in which the output side bevel gear 34 is enmeshed with the input side bevel gear 52, setting is made to position the axial direction position of the output side bevel gear 34 at an appropriate enmeshing position with the input side bevel gear 52 due to the leading end face of the output side bevel gear 34 contacting the inner face of the leading end wall portion 62. Moreover, in the clutch disconnected state in which the pin 35 is pressed by the cam faces 11, 12 of the selector 10 and the output side bevel gear 34 has separated from the input side bevel gear 52, the leading end face of the output side bevel gear 34 separates from the inner face of the leading end wall portion 62.

(2) Multi-Shaft Drive Device Operation

Explanation follows regarding operation of the multi-shaft drive device described above.

FIG. 2 and FIG. 4 illustrate a state in which the dial 69 has been rotated (the rotation shaft 16 has been rotated in a C1 direction), moving the selector 10 in the Y direction, and the pin 35 of the output side clutch member 32 of the first output portion 30A is projecting out and fitting into the first recessed portion 13A. Here, the output side bevel gear 34 of the first output portion 30A is enmeshed with the input side bevel gear 52 corresponding to the first output portion 30A, achieving the clutch connected state. In the other output portions 30 (the second output portion 30 and the third output portion 30), the pins 35 are pressed by the cam faces 11, 12 and the output side bevel gears 34 are separated from the corresponding input side bevel gears 52. In this state, one of the end portions (the contact portions 17A) of the pinion 17 provided to the rotation shaft 16 is in contact with the vertical wall portion 1A of the case 1. Further rotation of the rotation shaft 16 in the C1 direction is accordingly restricted.

When the dial 69 is rotated (the rotation shaft 16 is rotated in a C2 direction) from this state to move the selector 10 a specific distance in the Y1 direction, the pin 35 of the second output portion 30B projects out and fits into the second recessed portion 13B, and the output side bevel gear 34 of the second output portion 30B enmeshes with the corresponding input side bevel gear 52, to achieve a clutch connected state. When this occurs, in the other output portions 30 (the first output portion 30A and the third output portion 30C), the pins 35 are pressed by the cam faces 11, 12, and the output side bevel gears 34 separate from the corresponding input side bevel gears 52 to achieve a clutch disconnected state.

Figure 6:
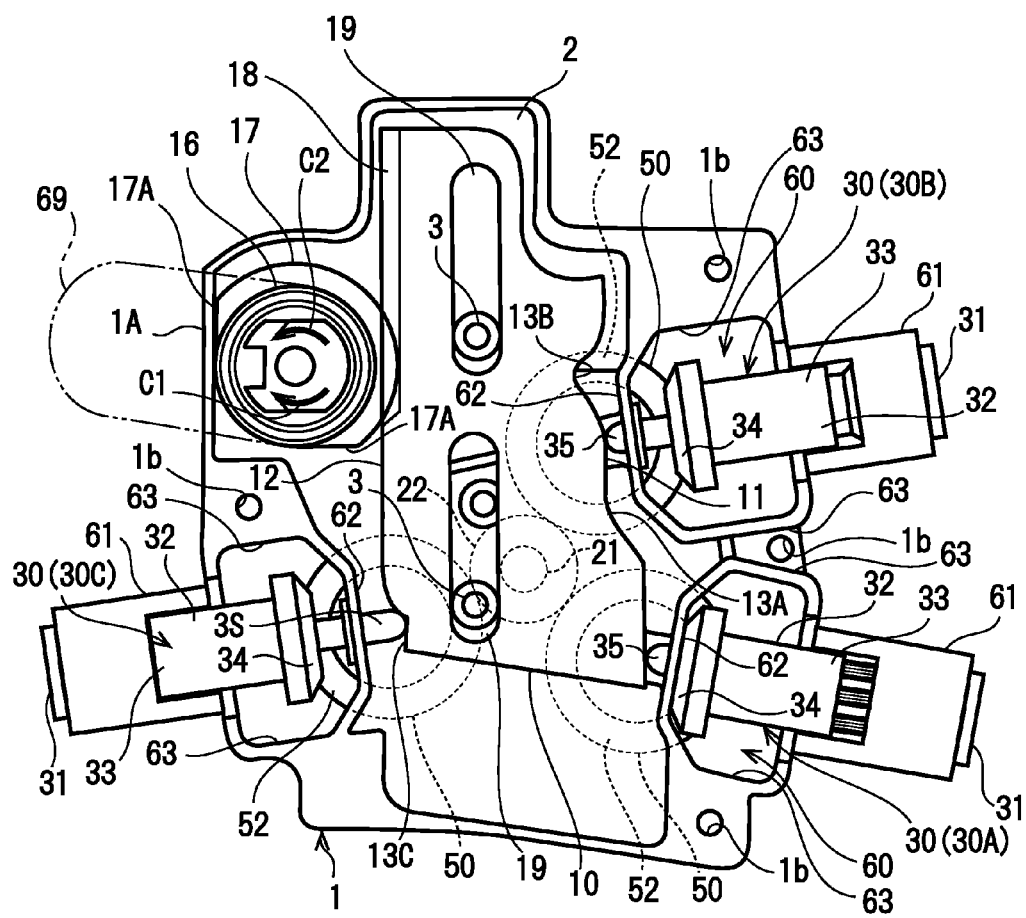
FIG. 6 is a plan view of the multi-shaft drive device.

Further, as illustrated in FIG. 6, when the dial 69 is rotated (the rotation shaft 16 is rotated in the C2 direction) to move the selector 10 a specific distance in the Y1 direction, the pin 35 of the third output portion 30C projects out and fits into the third recessed portion 13C, and the output side bevel gear 34 of the third output portion 30C enmeshes with the corresponding input side bevel gear 52, to achieve a clutch connected state. When this occurs, in the other output portions 30 (the first output portion 30A and the second output portion 30B), the pins 35 are pressed by the cam face 11, and the output side bevel gears 34 separate from the corresponding input side bevel gears 52 to achieve a clutch disconnected state. In this state, the other end portion (contact portion 17A) of the pinion 17 provided to the rotation shaft 16 is in contact with the vertical wall portion 1A of the case 1. Further rotation of the rotation shaft 16 in the C2 direction is accordingly restricted.

The selector 10 moves back and forth in the Y direction with forward and reverse rotation of the dial 69. Along the path of this movement, the pins 35 project out and fit into any one of the recessed portions 13A to 13C of the selector 10, and when this occurs, one of the output portions 30 out of the first to third output portions 30A to 30C is selected as described above. The output side bevel gear 34 of the selected output portion 30 enmeshes with the corresponding input side bevel gear 52 to achieve the clutch connected state.

In this clutch connected state, when the switch is switched ON and the motor 20 is actuated, the power of the motor 20 is transmitted from the input side bevel gear 52 to the output side bevel gear 34, rotating the overall output side clutch member 32, and thereby rotating the output shaft 31. The torque cable connected to the output shaft 31 of the selected output portion 30 accordingly rotates, achieving an actuated state. The rotation direction of the output shafts 31 and the torque cables can be switched by switching the rotation direction of the motor 20 using the switch.

According to the exemplary embodiment described above, the end portions (contact portions 17A) of the pinion 17 and the vertical wall portion 1A of the case 1 are provided to serve as restriction portions that restrict the rotation angle of the rotation shaft 16. Operation force input into the rotation shaft is accordingly prevented from being borne directly by the rack 18 and the pinion 17. As a result, in the present exemplary embodiment it is possible to prevent damage to the rack 18 and the pinion 17 due to operation load input into the selector 10 from the rotation shaft 16.

According to the exemplary embodiment described above, the respective output portions 30 are housed in the housing portions 60 formed to the case 1. In this housed state, the output side bevel gears 34 of the output side clutch members 32 that are biased in the direction of the input side bevel gears 52 by the coil springs 36 are enclosed by the support portions 61, the leading end wall portions 62 and the pairs of side wall portions 63 integrally formed to the case 1. When in the clutch connected state, the leading end faces of the output side bevel gears 34 contact the leading end wall portions 62, thereby restricting the axial direction position of the output side bevel gears 34 such that the output side bevel gears 34 always enmesh appropriately with the input side bevel gears 52.

The leading end wall portions 62 are pressed by the output side bevel gears 34 biased by the coil springs 36, however since the leading end wall portions 62 are integrally formed to the case 1 together with the support portions 61 and the pairs of wall portions 63, stress received due to this pushing is not concentrated on the leading end wall portions 62 and is distributed around the overall case 1 through the support portions 61 and the pairs of wall portions 63, thereby enabling deformation of the leading end wall portions 62 to be suppressed. The axial direction positions of the output side bevel gears 34 can accordingly be reliably positioned at uniform positions due to contacting the leading end wall portions 62. Moreover, in the present exemplary embodiment the input side bevel gears 52 are also supported and positioned by the case 1 similarly to the output side bevel gears 34, such that relative positional displacement between the two does not readily occur. Backlash can therefore always be stabilized with a high degree of precision in the enmeshed state of the output side bevel gears 34 with the input side bevel gears 52. The advantageous effects that tooth end bearing of the output side bevel gears 34 with respect to the input side bevel gears 52 can be suppressed, increasing durability, and enabling as a result a reduction in operation noise occurring during enmeshing to be obtained.

Note that in the above exemplary embodiment, the selector 10 of the present invention is configured so as to move along a straight line, however modification may be made to the present invention such that the selector 10 is a circular plate shaped rotating member with the peripheral face configuring the cam face, wherein the plural output portions 30 are disposed to the periphery of the cam face.

(3) Modified Example

Figure 7A:
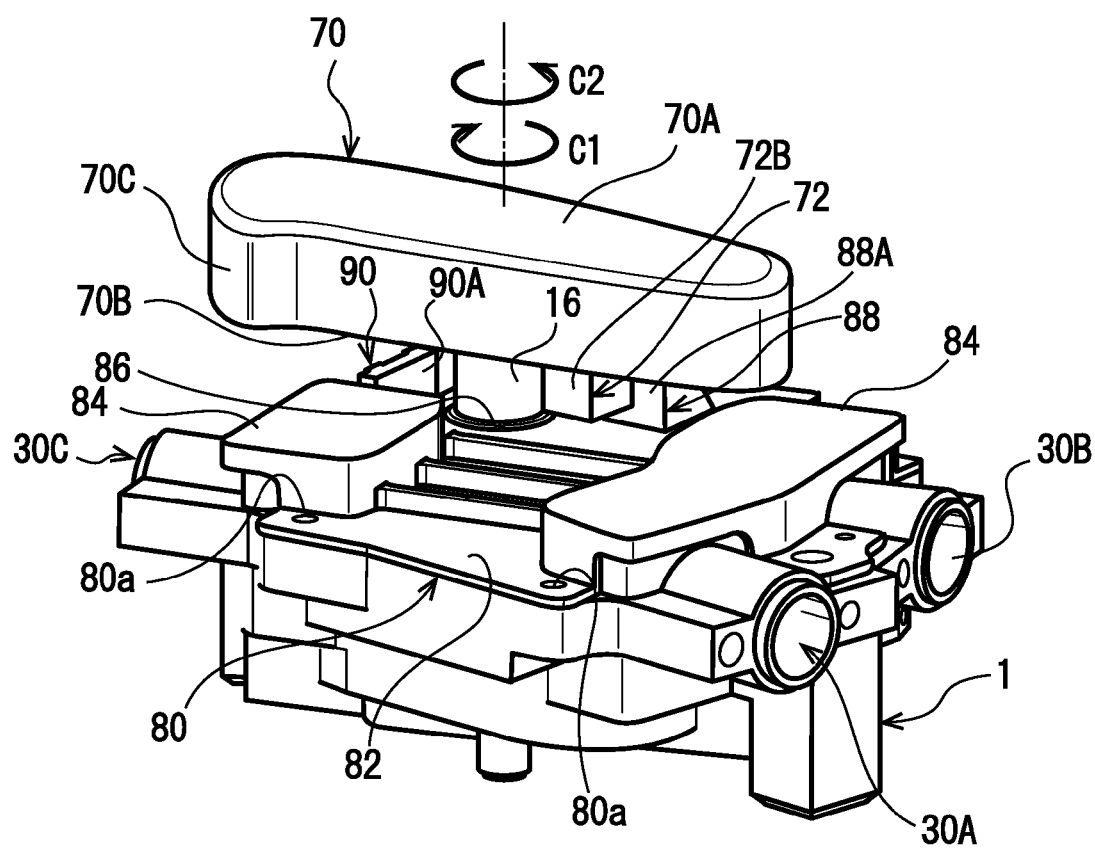
FIG. 7A is a perspective view illustrating a multi-shaft drive device according to a modified example.
Figure 7B:
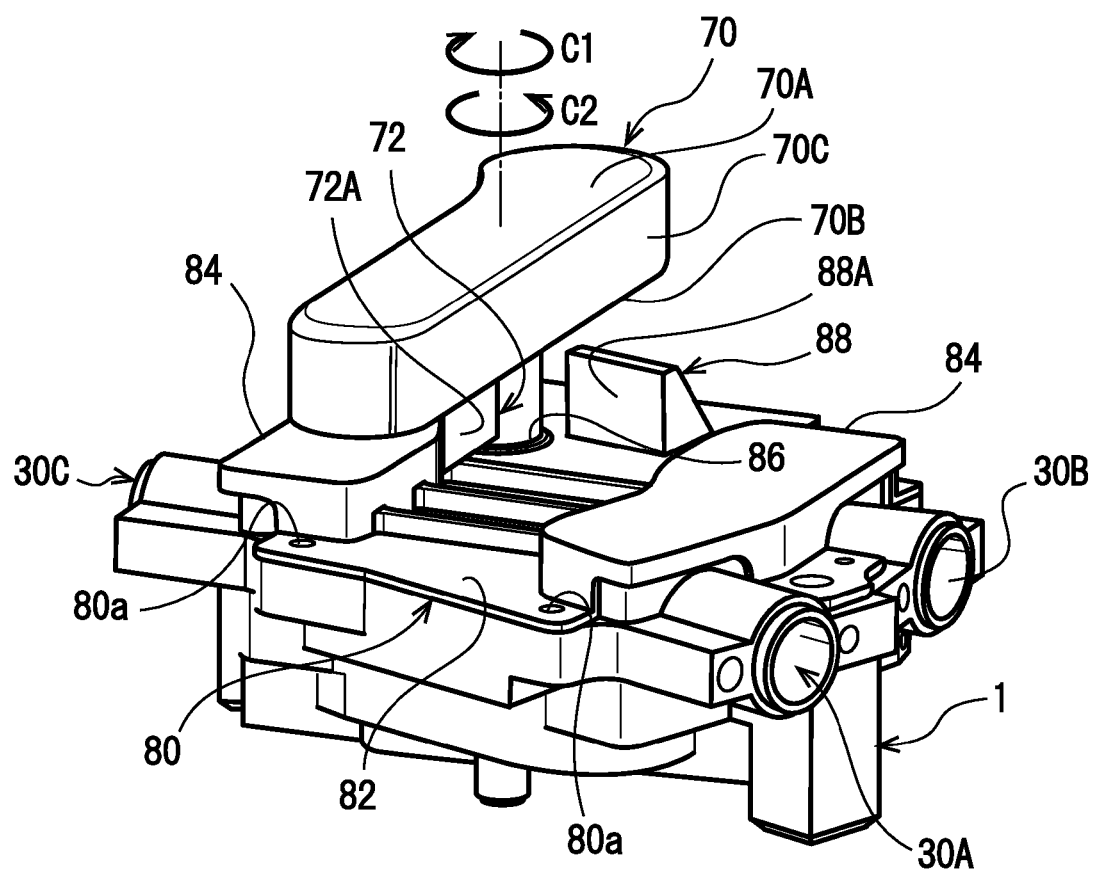
FIG. 7B is a perspective view illustrating a multi-shaft drive device according to a modified example.

Explanation follows regarding a modified example of the above exemplary embodiment with reference to FIG. 7A and FIG. 7B.

Note that members similar to those of the above exemplary embodiment are allocated the same reference numerals and explanation thereof is omitted.

In the multi-shaft drive device according to the present modified example, a dial 70 is fixed to an end portion of the rotation shaft 16, and a portion of the dial 70 contacts a portion of the case 1, thereby restricting the rotation angle of the rotation shaft 16.

Specifically, the dial 70 serving as an operation means is a component with an elongated shape with length direction in the direction orthogonal to the rotation shaft 16 axial direction. The dial 70 is provided with an upper wall portion 70A and a lower wall portion 70B that extend in a direction substantially orthogonal to the rotation shaft 16 axial direction, and a side wall portion 70C that connects together the upper wall portion 70A and the lower wall portion 70B. The lower wall portion 70B is formed with a fixing hole, not illustrated in the drawings, formed to follow the profile of the end portion of the rotation shaft 16. The end portion of the rotation shaft 16 is inserted into the fixing hole, and the dial 70 is fixed to the end portion of the rotation shaft 16 using a screw, not shown in the drawings. The lower wall portion 70B is further provided with a substantially rectangular box shaped projection portion 72 serving as a contact portion. The projection portion 72 is disposed at a location adjacent to the fixing hole provided to the lower wall portion 70B. In the resulting configuration, the projection portion 72 moves so as to rotate about the rotation shaft 16. The faces of the projection portion 72 facing along the rotation shaft 16 circumferential direction configure a first contact face 72A and a second contact face 72B.

A cover 80 includes a base portion 82 that covers the recessed area 2 (see FIG. 2) of the case 1. The cover 80 is further provided with a protruding portion 84 formed so as to project out from the base portion 82 in the motor shaft 21 (see FIG. 2) axial direction and to cover the housing portion 60 (see FIG. 2). The base portion 82 is formed with an insertion and passing hole 86 through which the rotation shaft 16 is inserted and passed. The base portion 82 is also provided with a first projection portion 88 and a second projection portion 90 that serve as contacted portions and are formed projecting out in the base portion 82 plate thickness direction. The first projection portion 88 and the second projection portion 90 are formed in substantially rectangular box shapes, and are disposed at locations adjacent to the insertion and passing hole 86. Faces of the first projection portion 88 and the second projection portion 90 facing towards the insertion and passing hole 86 side configure a first contacted face 88A and a second contacted face 90A that contact the first contact face 72A and the second contact face 72B of the projection portion 72. Attachment holes 80a are also formed to the base portion 82. Screws are inserted and passed through the attachment holes 80a and tightened in attachment holes 1b (see FIG. 2) formed in the case 1, thereby fixing the cover 80 to the case 1. Note that in the fixed state of the cover 80 to the case 1, the cover 80 may be regarded as forming a portion of the case 1.

(4) Modified Example Operation

When the dial 70 is rotated in the direction of the arrow C2 in order to select the output portion 30 (30A, 30B, 30C) to which the power of the motor 20 is to be transmitted, the first contact face 72A of the projection portion 72 provided to the dial 70 contacts the first contacted face 88A of the first projection portion 88 provided to the cover 80. Further rotation of the dial 70 in the arrow C2 direction is accordingly restricted. When the dial 70 is rotated in the direction of the arrow C1, the second contact face 72B of the projection portion 72 provided to the dial 70 contacts the second contacted face 90A of the second projection portion 90 provided to the cover 80. Further rotation of the dial 70 in the arrow C1 direction is accordingly restricted. As a result, in the present exemplary embodiment damage to the rack 18 and the pinion 17 due to operation load input from the dial 70, through the rotation shaft 16, and into the selector 10 can be prevented.

Note that in the exemplary embodiment and the modified example described above, explanation has been given of an example wherein the contact portion 17A provided to the rotation shaft 16 contacts the vertical wall portion 1A of the case 1 to configure the restriction portion that restricts the rotation angle of the rotation shaft 16, and of an example wherein a portion of the dial 70 contacts the projection portions (first projection portion 88, second projection portion 90) of the cover 80 fixed to the case 1 to configure the restriction portion that restricts the rotation angle of the rotation shaft 16, however the present invention is not limited thereto. For example, in cases in which the rotation shaft 16 is rotated through plural gears or the like, configuration may be made wherein a restriction portion is provided to these plural gears. The location to which the restriction portion is provided may accordingly be set as appropriate in consideration of the configuration of the operation means connected to the rotation shaft 16.

Explanation has been given above of an exemplary embodiment and a modified example of the present invention, however the present invention is not limited to the above, and obviously various modifications other than those described above may be implemented within a range not departing from the spirit of the present invention.

What is claimed is:

1. A multi-shaft drive device comprising:
   a single motor that is fixed to a case and that drives a plurality of movable mechanisms mounted to a vehicle;
   an input side gear that is provided inside the case and that transmits power of the motor;
   an output side gear that is provided so as to be capable of projecting forwards and retreating with respect to the input side gear, thereby selectively enmeshing with the input side gear, and transmitting power transmitted from the input side gear to the movable mechanism;
   a selector that is provided with a rack to allow the selector to slide in one direction and an opposite direction to the one direction, that presses a portion of the output side gear to move the output side gear, and disconnects enmeshing between the output side gear and the input side gear;
   a rotation shaft that is provided with a pinion that enmeshes with the rack provided to the selector, the rotation shaft rotating about its axis due to operation force input to an operation means so as to slide the selector; and a restriction portion that is provided to a side of the operation means including the rotation shaft, and that restricts the rotation angle of the rotation shaft.

2. The multi-shaft drive device of claim 1, wherein the restriction portion comprises:
   the operation means fixed to the rotation shaft; and
   a contacted portion that is provided to the case and is contacted by a portion of the operation means.

3. The multi-shaft drive device of claim 1, wherein the restriction portion comprises:
   a contact portion that is provided inside the case and that is formed to a portion of the rotation shaft; and
   a contacted portion that is provided to the case and that is contacted by the contact portion.

* * * * *